United States Patent [19]
Pierson et al.

[11] Patent Number: 6,153,283
[45] Date of Patent: Nov. 28, 2000

[54] STRUCTURE HAVING AT LEAST ONE IMPROVED SURFACE AND A METHOD OF MAKING THE STRUCTURE

[75] Inventors: Richard E. Pierson; Robert M. Evans, both of Coral Springs, Fla.

[73] Assignee: Steelwood Extruding Corp., Coral Spring, Fla.

[21] Appl. No.: 09/021,775

[22] Filed: Feb. 11, 1998

[51] Int. Cl.[7] .................. B32B 3/00; E06B 3/12; B28B 5/00
[52] U.S. Cl. .................. 428/141; 428/172; 428/217; 428/207; 264/241; 160/236
[58] Field of Search .................. 428/156, 141, 428/172, 217, 207; 264/257, 241; 160/236; 156/277

[56] References Cited

U.S. PATENT DOCUMENTS

| | | | |
|---|---|---|---|
| 2,660,757 | 12/1953 | Smith et al. | 428/156 |
| 3,484,835 | 12/1969 | Trounstine et al. | 428/156 |
| 3,645,317 | 2/1972 | Malone | 160/168.1 |
| 3,687,764 | 8/1972 | Rogosch et al. | 428/156 |
| 3,911,187 | 10/1975 | Raley | 428/156 |
| 4,049,038 | 9/1977 | Hyman et al. | 160/166 |
| 4,100,325 | 7/1978 | Summers et al. | 428/334 |
| 4,183,777 | 1/1980 | Summers et al. | 156/243 |
| 4,376,147 | 3/1983 | Byrne et al. | 428/156 |
| 4,728,677 | 3/1988 | Lacatus et al. | 523/135 |
| 4,755,414 | 7/1988 | Lacatus et al. | 428/156 |
| 4,842,036 | 6/1989 | Goodman | 160/166.1 |
| 4,877,077 | 10/1989 | Ebert | 160/236 |
| 4,884,615 | 12/1989 | Hsu | 160/236 |
| 5,102,598 | 4/1992 | Chen | 264/140 |
| 5,119,871 | 6/1992 | Schwaegerle | 160/236 |
| 5,194,209 | 3/1993 | Schwaegerle | 264/132 |
| 5,311,814 | 5/1994 | Kierson | 101/6 |
| 5,447,758 | 9/1995 | Pelletier | 427/511 |
| 5,832,979 | 11/1998 | Marusak | 160/173 |
| B1 4,877,077 | 7/1991 | Ebert | 160/236 |

FOREIGN PATENT DOCUMENTS

| | | |
|---|---|---|
| 2032702 | 9/1991 | Canada . |
| 2029033 | 5/1992 | Canada . |
| 2102412 | 12/1992 | Canada . |
| 1316678 | 4/1993 | Canada . |
| 2153558 | 1/1996 | Canada . |
| 158-047 | 12/1982 | German Dem. Rep. . |
| 34 46 662 A1 | 6/1986 | Germany . |
| 4-143395 | 5/1992 | Japan . |

*Primary Examiner*—Donald Loney
*Attorney, Agent, or Firm*—Skjerven, Morrill, MacPherson LLP; John T. Winburn

[57] ABSTRACT

An improved more fabric-like, softer feel surface for a single layer or composite structures, such as utilized for vertical and horizontal blind louvers or slats. A patterned, textured or printed, surface can be formed on one or both sides of the structure. The improved surface provides an enhanced visual and tactile impression. The structure is formed of a single layer of a non-rigid plasticized thermoplastic polymer or a composite structure with a substantially rigid thermoplastic PVC, CPVC or ABS substrate and the softer surface formed by a non-rigid plasticized thermoplastic polymer layer or capstock formed on one or both sides. Either or both of the softer surfaces can be formed with different pigments, including pearlescent and colors, can be printed or patterned and can be embossed with or without an underlying pattern providing a virtually endless array of options.

44 Claims, 3 Drawing Sheets

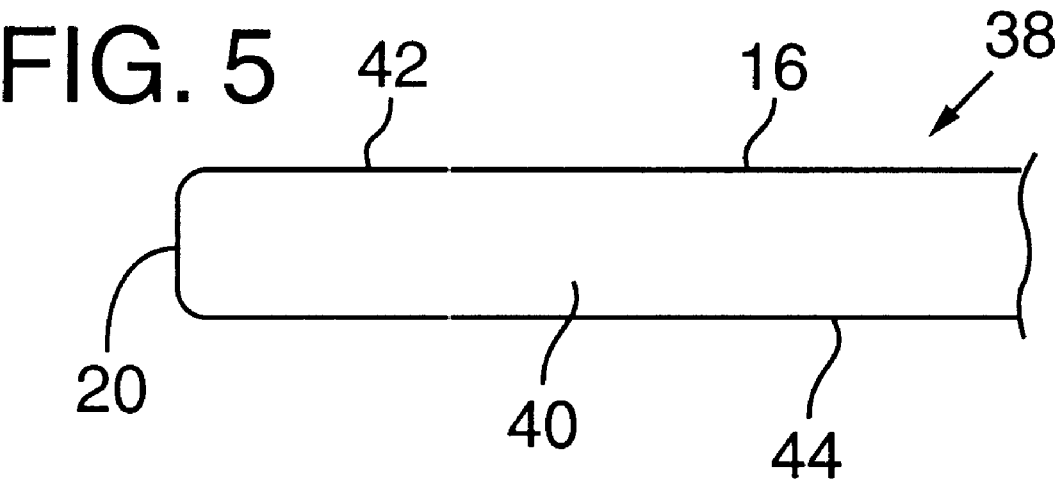
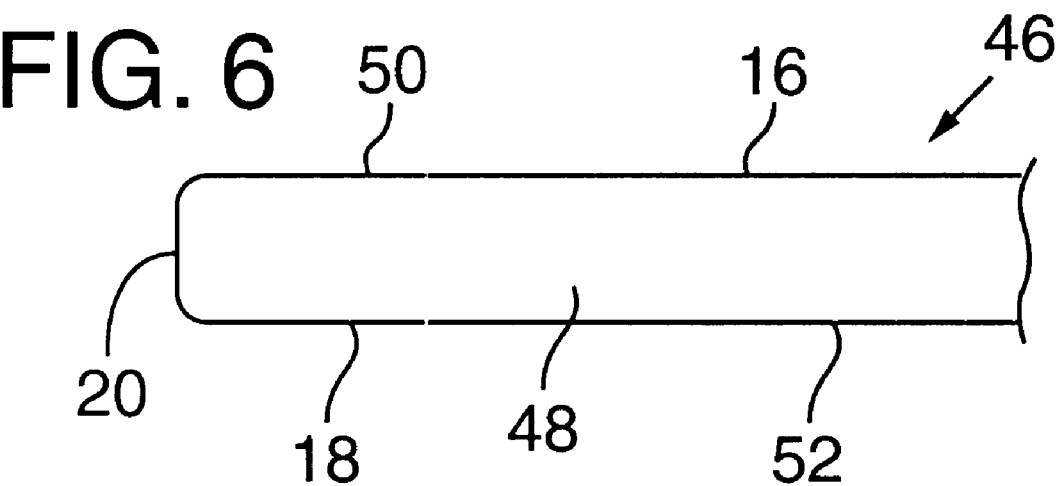

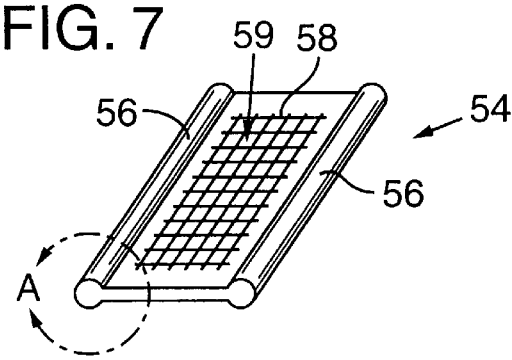
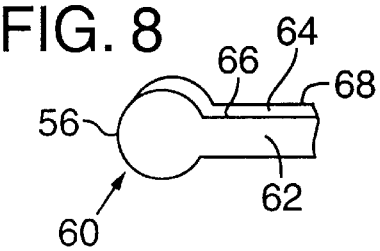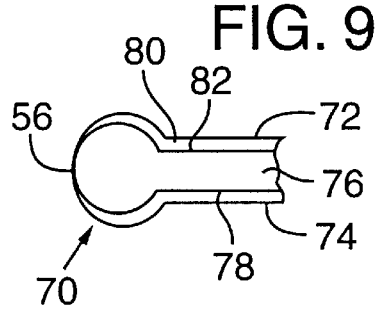
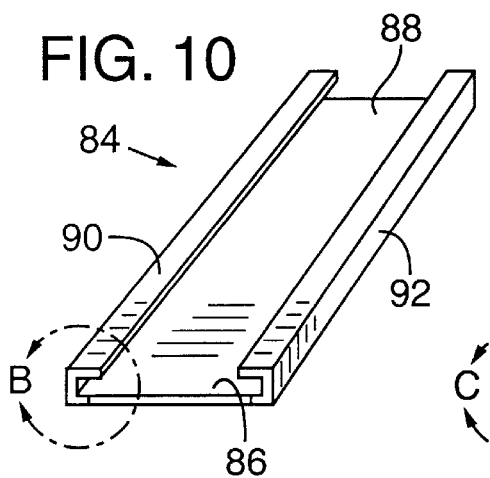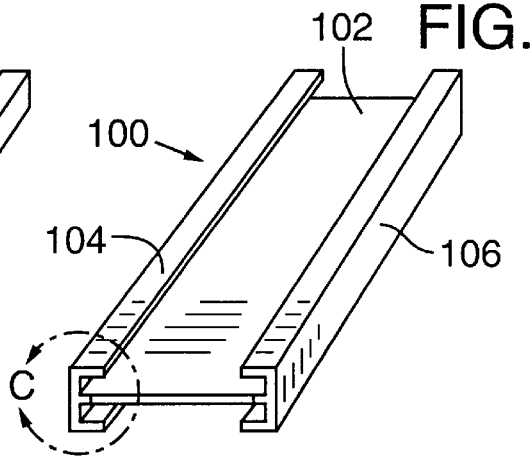
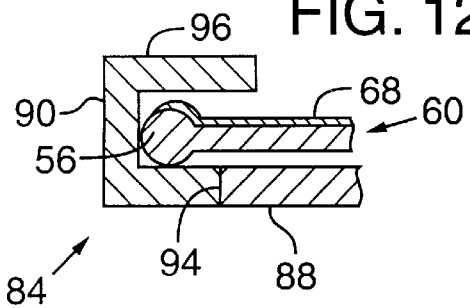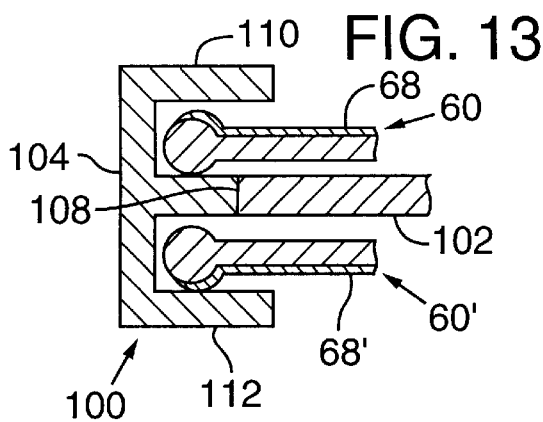

6,153,283

STRUCTURE HAVING AT LEAST ONE IMPROVED SURFACE AND A METHOD OF MAKING THE STRUCTURE

BACKGROUND OF THE INVENTION

This invention relates generally to a single layer or a composite structure having an improved surface. More particularly, the invention is directed to forming an improved surface with an enhanced look and softer feel to the touch on one or both sides of the structure. The single or composite structure can be utilized for a variety of uses, such as an interior textured surface, for example, utilized as vertical or horizontal blind louvers or slats. The composite structure includes a substrate formed of substantially rigid PVC, CPVC or ABS or other thermoplastic polymer and at least one layer of a substantially non-rigid plasticized thermoplastic polymer capstock or lamination, which can be textured for a softer more fabric-like look and touch. The single layer structure would be formed from a single layer of the less rigid thermoplastic polymer structure.

In recent years, horizontal and vertical blind louver systems have become popular for utilization as window coverings, in both residential and commercial buildings. Typical vertical blind louver systems include a plurality of relatively thin elongated louvers or slats which are vertically suspended from a mechanism which aligns and orients the louvers as desired. Generally the louvers slightly overlap one another and can be rotated in unison to essentially infinitely adjust the opening between the louvers for blocking or allowing light to enter as desired. The vertical system can be either side or center opening. The louvers conventionally are formed from a variety of materials including extruded vinyl louvers, which can include decorative attached webs, fabrics or laminated layers on one or both sides of the louvers.

Horizontal blind louver systems are assembled in a mechanism which aligns the louvers, overlapping with one another in a horizontal alignment. The operation of the horizontal blind system is otherwise very similar to that of the vertical blind system.

One of the most popular types of louvers is formed by co-extrusion of thermoplastic polymer materials, including a rigid substrate formed from polyvinyl chloride (PVC), chlorinated polyvinyl chloride polymer (CPVC) or acrylonitride-butadiene-styrene polymer (ABS). A plasticized polymer capstock is coextruded or laminated onto the substrate, which when cooled also becomes rigid to form a rigid composite structure blind louver. The durometer of the capstock is substantially the same as the durometer of the substrate. The louver can be formed in a planar or preferably in a slightly curved bill or s-shaped cross section. The louver also can be formed having lateral rounded clear edges with an opaque central portion or all from the same material. At least the central portion can have an outer capstock layer of a pearlescent material on one or both sides of the louver to improve the visual look of the louver.

Vertical blind louver systems also can include louvers which are formed with a single or double groove or channel louver structure. The louver will accept an insert slat in one side of the single channel louver captured by grooves on each edge of the louver. The louver will accept an insert slat in both sides of the double channel louver, each slat captured by pairs of grooves on the opposite sides of each edge of the louvers. The insert slat can be a single layer or a composite structure.

The louver also can be formed having an embossed outer surface, typically on the capstock layer. The embossing of the surface forms a texture having a decorative pattern, which can be selected as desired. Such patterns are utilized to improve the visual effect or "look" of the louver blind system.

The decorative patterns formed by the prior art processes typically are not as distinctive as desired and only can be seen at a distance of about five (5) feet or less. The rigid louver surface can have a slick hard plastic, almost metallic feel (tactile) to the touch. The decorative pattern where utilized, also does not have as distinctive a texture as desired, but can have a hard rounded, or almost smooth plastic surface. The prior art generally has focused on the visual impression, although attempts have been made to improve the tactile impression. This desirable goal has not been achieved by the prior art processes in the resulting single layer and composite structures.

It would be desirable to enhance at least one surface on a structure, to provide an improved look (visual) and feel (tactile) to the structure surface, such as utilized for the louvers or slats of a blind system. The technique also could be utilized for other types of decorative panels which can be textured for both interior and exterior utilization. The resulting enhanced decorative pattern provides a softer, less plastic, more fabric like look and feel.

SUMMARY OF THE INVENTION

The invention provides an improved softer feeling, more fabric like surface for a single layer or a composite structure, such as utilized for vertical and horizontal blind louvers or slats. A printed and/or textured patterned surface can be formed on one or both sides of the structure. The improved surface provides an enhanced visual and tactile impression. The structure can be formed of a single layer of a non-rigid plasticized thermoplastic polymer or a composite structure with a substantially rigid thermoplastic polymer, such as PVC, CPVC or ABS, substrate and a softer surface formed by a non-rigid plasticized thermoplastic polymer layer or capstock formed on one or both sides. Either or both of the softer surfaces can be formed with different pigments, including pearlescent and colors, can be printed or patterned and can be embossed with or without an underlying pattern providing a virtually endless array of options.

BRIEF DESCRIPTION OF THE DRAWINGS

FIG. 5 is a side view of a third embodiment single layer of the louver of the present invention, having a single improved surface;

FIG. 6 is a side view of another single layer embodiment of the louver of the present invention, having an improved surface on both sides of the louver;

FIG. 7 is a perspective view of a blind louver slat embodiment which can be utilized as a louver insert;

FIG. 8 is a side view of a louver slat within circle A of FIG. 7, having one improved surface;

FIG. 9 is a side view of a louver slat within circle A of FIG. 7 having an improved surface on both sides;

FIG. 10 is a perspective view of a blind louver having a single channel to receive a single louver slat;

FIG. 11 is a perspective view of a blind louver having a pair of channels to receive a louver slat on each side;

FIG. 12 is an enlarged representation of the blind louver within circle B of FIG. 10 with a slat therein; and FIG. 13 is an enlarged representation of the blind louver within circle C of FIG. 11 with a pair of slats therein.

DETAILED DESCRIPTION OF THE PREFERRED EMBODIMENTS

Figure 1:
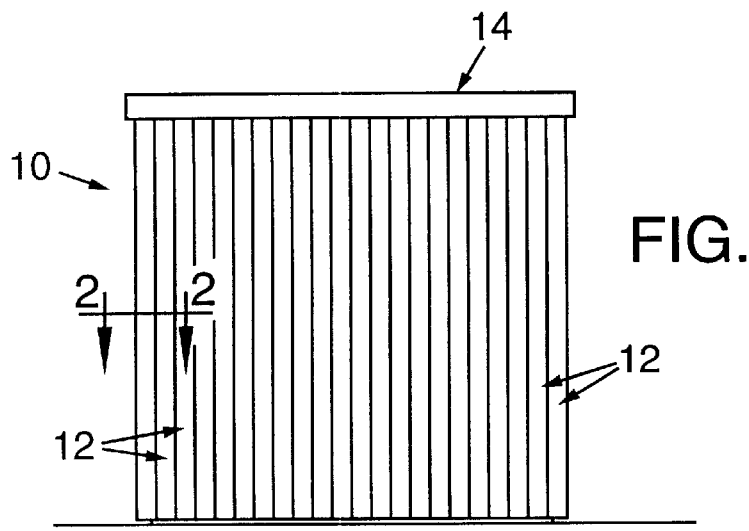
FIG. 1 is a side elevational view of a vertical blind louver system.

Referring to FIG. 1, a vertical blind louver system which can incorporate the improved blind louver, louver insert or slat of the present invention is designated generally by the reference numeral 10. The system 10 includes a plurality of louvers 12 arranged and aligned vertically in a louver track system 14, as is common in the window covering industry. The system 14 generally allows for rotation of the aligned louvers 12 in unison to adjust the view or amount of light allowed through the system 10. The louvers 12 also generally can be gathered at one or both sides, depending upon the design of the system 10, to provide an unobstructed view or for maximum light to pass through the system 10. Although described herein for use in a vertical blind system 10, the present invention can be utilized in other panels, specifically including horizontal blind systems.

Figure 2:
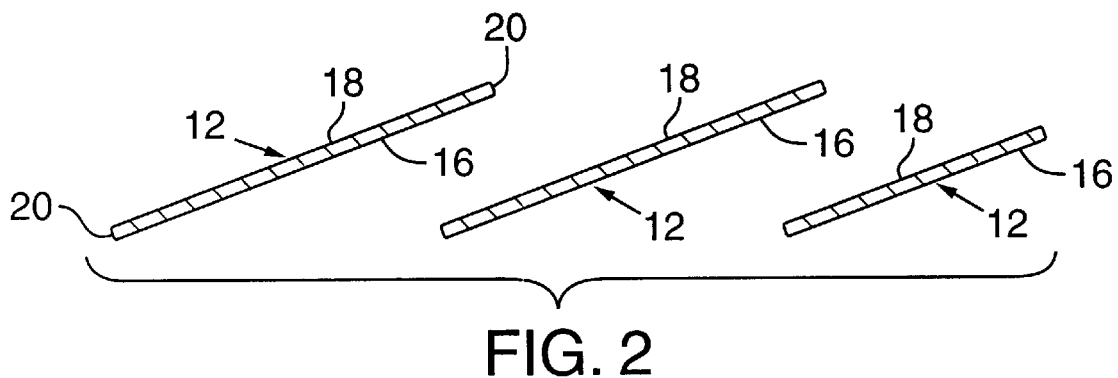
FIG. 2 is an enlarged sectional view of a plurality of blind louvers taken along the line 2—2 of FIG. 1.

A top vertical view of a plurality of the louvers 12 is illustrated in FIG. 2. The individual louvers 12 are illustrated having a planar configuration but generally, and most preferredly, are arcurate or s-shaped in cross section. The louvers 12 are illustrated partially rotated around their vertical axis. The louvers include an interior surface 16 and an exterior surface 18. Each louver 12 also includes a pair of opposite lateral edges 20.

Figure 3:
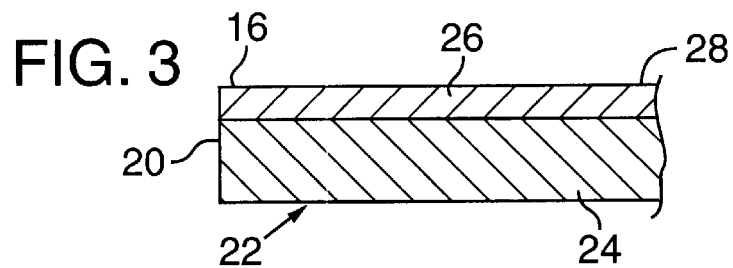
FIG. 3 is a further enlarged cross-section of one composite structure embodiment of the blind louver of the present invention, having a single improved surface.

Preferably, especially for blind louver structures, the present invention is formed as a multilayer composite structure, such as illustrated in a first embodiment 22 in FIG. 3. The structure 22 includes a rigid substrate layer 24 formed from a thermoplastic polymer, for example, PVC, CPVC or ABS polymer material, as is conventional in the window covering industry. The edge 20 can be substantially straight or partially or totally rounded (see FIGS. 7 and 8) and can be formed as a structural enhancement for the louver structure 22. The structure 22 also includes a second layer 26 formed from a softer plasticized thermoplastic polymer, which has a substantially lower durometer and which forms a substantially non-rigid layer in contrast to the substrate 24. Applicants have discovered that this substantially less rigid, lower durometer thermoplastic material has a softer more fabric-like feel and also flows more completely into the decorative embossing pattern (when utilized) in the outer roller, typically of a coextruding assembly. The coextruding process is conventional in the window covering industry.

The structure 22 includes an improved soft feel surface 28 of the present invention, which also can be printed and/or embossed, typically to form a decorative pattern on the soft non-rigid durometer layer 26. Typically, the decorative surface 28 is formed at least on the interior surface 16 of the louver structure 22.

The durometer of the rigid substrate layer 24, typically is on the order of at least about a 80 durometer, as measured on the "Shore D" scale. The durometer of the softer, non-rigid layer 26 is dramatically less than the rigid layer 24, typically in a range of about 60 to 95 durometer, as measured on the "Shore A" scale. For a coextruded composite structure 22 utilized for a blind louver or slat, preferably the substrate 24 is on the order of 74 to 84, and most preferably about 84, as measured on the "Shore D" scale. The softer capstock layer 26, preferably is on the order of 60 to 95, and most preferably about 65 to 70, as measured on the "Shore A" scale. As utilized herein, "rigid" is measured on the "Shore D" scale and has a durometer on the order of 74 to 84. In interim scale between the "Shore A and D" scale is a "Shore C" scale. Non-rigid is measured on the "Shore A" scale and has a durometer on the order of 60 to 95.

As is known in the art, each of these scales somewhat overlaps and there can be materials which can have measurements on two or more of the scales. For example, the Shore A values of 77.5 and below are off the bottom of both the C and D Scales. A value of 80 on Shore A is a value of 50 on Shore C but off the D Scale. At the other end, the "rigid" substrate in the range of 74 to 84 in the Shore D scale overlaps with the top of the Shore C scale at 93 plus, but is off the top of the Shore A scale. The top of the Shore A scale having values of 92.5 and 95.0 overlaps the Shore C scale at values of 71.5 and 77.5 and also overlaps the bottom of the Shore D scale at values of 49.0 and 54.0. The non-rigid layer 26, in the Shore A scale range of 60 to 90 has no equivalent at all on the Shore D scale, but falls below all Shore D values. In a like manner the rigid substrate layer 24, in the Shore D scale range of 74 to 84 has no equivalent at all on the Shore A scale, lying above all Shore A values.

The softness and rigidity of the layer 26 is controlled by the utilization of a monomeric or polymeric plasticizer, preferably a polymeric plasticizer to avoid migration in the resulting structure. Again, although the textured surface 28 is preferable, the soft touch or tactile impression of the layer 26 of the present invention, may be desirable alone without an embossed pattern. A surface pattern could be printed on the surface of the layer 26 with or without embossing. Also, as is well known in the wall covering industry, either or both of the layers 24 and 26 can include color pigments, such as dyes, be transparent, semi-transparent or opaque and can also include or be formed from pearlescent material, as will be described more fully hereinafter.

When utilized herein, "opaque" is a material which allows very little or no light to pass therethrough. As is well known in the art, opaque properties can be formed utilizing various pigments, screeners, fillers, minerals and other materials and combinations thereof. When utilized herein, "semi-transparent", "translucent" and "semi-opaque" are materials which allow a substantial amount of light to pass therethrough, sometimes considered light filters, but are not fully transparent. These materials also are formed of various colorants and other materials, like the opaque materials, again as is well known in the art. As utilized herein, "transparent" is a material which allows most all light to pass and can easily be seen through.

The softer durometer layer 26, however, allows the textured surface 28 or decorative embossed pattern to be much improved over the prior art. Utilizing the same embossing pattern, the softer material in the layer 26 appears to fill the embossing die or roller more completely, providing an embossed pattern, having a significantly enhanced optical and tactile impression. While the prior art textured pattern can be seen clearly from an average distance of less than about five (5) feet, the improved textured surface 18 easily can be seen from a distance on the order of ten (10) to twenty (20) feet. This provides a visual improvement in the same illumination on the order of least one hundred (100) to two hundred (200) percent over that of the prior art. The lighting in an average room setting enhances the visibility of the textured surface, both of the prior art and of the present invention. The tactile sense also is vastly improved due to the lower durometer material which forms the improved textured surface 18, and provides a greatly enhanced more fabric like feel to the textured surface 18.

As mentioned, the structure 22 also can include just the improved tactile feel surface 16, without the textured surface 18. The interior surface 16 can include a surface printed design or pattern, can be left natural, and/or can include pearlescent and/or the dyes or pigments internally in the layer 26. In any case, the two layers 24 and 26 will be formed from substantially different materials, whether including the textured surface 18 or not.

Figure 4:
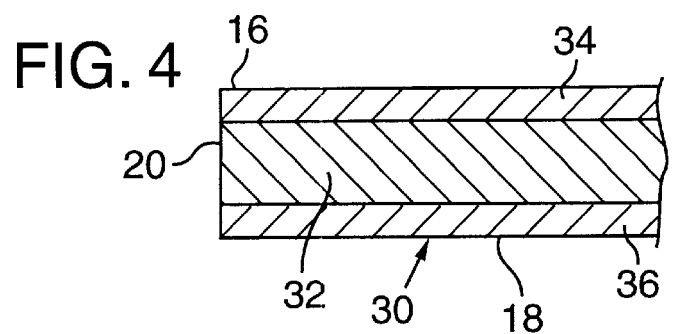
FIG. 4 is a cross-section like FIG. 3 of a second embodiment of the blind louver of the present invention, having an improved surface on both sides of the louver.

Referring now to FIG. 4, a double sided composite structure 30 is best illustrated. The composite structure 30 again includes a rigid substrate layer 32. The substrate 32, however, is capped or coated with a softer non-rigid layer 34 on one side or a second softer non-rigid layer 36 on the opposite side. For example purposes, the surface of the layer 34 can be the interior surface 16, while the surface of the layer 36 can be the exterior surface 18. By including a softer non-rigid layer or capstock 34, 36 on both sides of the substrate 32, maximum flexibility of look and design can be provided, such as for use as the louvers 12. The interior surface 16 can include a textured pattern, or not, and include a dye or other pigment, such as pearlescent and the exterior surface 18 can include a different textured pattern, or not and a different dye or pigment, as desired. This can provide the same look or a dramatically different look on opposite sides of the composite structure 30 and when utilized as the louver 12, can be rotated for viewing either side 16 or 18 as desired.

Referring now to FIG. 5, a single layer embodiment 38 of the present invention is best illustrated. The structure 38 is formed of a single soft non-rigid layer 40 and can be utilized as paneling or for other surface coverings or can be utilized as a louver slat, as will be described with respect to FIGS. 12 and 13. Like the structure 22, the structure 38 can include a single softer, preferably patterned surface 42, which can be the interior surface 16, when utilized in a louver structure like the louvers 12. The opposite (or back) surface 44 typically would be adhered or laminated to a surface or otherwise be secured against a mounting surface, especially where rigidity is needed for the flexible structure 38. Both sides also could be patterned and/or textured to provide a different pattern when the slat is reversed in the louver as described with respect to FIG. 6.

Another embodiment 46 of a single layer structure of the present invention is illustrated in FIG. 6. The structure 46 is substantially identical to the structure 38 and also contains a single layer 48 like the soft layer 40. The layer 48 also includes a first surface 50, which can be textured and/or decorated like the surface 42 and can serve as the interior surface 16, when utilized like the louver 12. In addition, the structure 46 also includes a second decorated or textured surface 52, which can be identical to or different from the surface 50 and can serve as the exterior surface 18. Each of the structures 38 and 46 include edges 20, which can just be rounded or can be enlarged to provide further structural strength for the structures 38 and 46. Again, the structures 38 and 46 can include various combinations of pigments, such as color, pearlescent, opacifying or combinations thereof to provide the desired appearance.

Referring now to FIGS. 7–13, there is illustrated a louver and louver slat system. A first louver slat 54 is illustrated in FIG. 7. The slat 54 includes opposite rounded lateral edges 56, which also can be utilized for the previously described edges 20. The slat edges 56 prevent a potential hazard when handling the slats 54, substantially eliminating the possibility of sharp edges. The edges 56 also provide structural strengthening of the slats 54, which is especially useful with the softer more flexible non-rigid polymers utilized in the present invention. A central web or central section 58 can be a single layer and can include a patterned and/or textured surface 59 of the present invention or can be a composite structure as illustrated in FIGS. 8 and 9. Although not illustrated, the pattern 59 generally will cover the whole side of the slat 54.

In FIG. 8, a composite structure louver slat 60 is illustrated. As described in FIGS. 5 and 6, the slat 54 also could be a single layer, such as the structure 38. The slat 60 includes the edges 56 formed with or part of a rigid substrate 62, like the substrate 24. The substrate 62 includes a second softer non-rigid layer or capstock 64, like the layer 26. If the layer 64 is transparent or partially transparent, such as some pearlescent materials, then an interface 66 can effect the look of a top surface 68 of the slat 60. Again, the top surface 68 can be patterned and/or textured if desired in accordance with the present invention.

Another embodiment of a composite structure louver slat 70 is illustrated in FIG. 9. In the slat 70, a different look is provided to a top surface 72 by coextruding an opaque bottom layer 74 onto a rigid substrate 76. The substrate 76 can include one or more color pigments and can be substantially or partially transparent providing a light reflective interface 78. A top softer non-rigid layer 80 can include a pearlescent or other pigment and be formed also substantially or partially transparent to provide another light reflective and diffusing interface 82. The layer 80 can include a textured and/or patterned surface 72, if desired.

A first embodiment of a louver assembly 84 is illustrated in FIGS. 10 and 12. The louver assembly 84 includes a louver body 86, which includes a central portion or web 88 and a pair of side channels or grooves 90, 92, which are fused such as at a joint 94 or formed with the web 88 to form an integral louver assembly 84. The channel 90 includes a portion 96 overlying part of the web 88, which captures edge 56 of the slat, such as the slat 60. The top surface 68 is oriented away from the web 88 and the portion or flange 96 also can be transparent if desired.

A double sided louver assembly 100 is illustrated in FIGS. 11 and 13. The louver assembly 100 again includes a central web 102 with a pair of double side channels or grooves 104, 108 fused at a joint 108 or formed therewith. The channel 104 includes an upper flange or portion 110 and a lower flange 112. A first slat 60 is inserted in the first channel under the flange 110 with the top surface 60 oriented away from the web 102. A second slat 60' is inserted in the second channel under the flange 112, again with the top surface 68' oriented away from the web 102. One or both of the slats 60, 60' could be replaced with the slat 70, which can include different and the same patterns and/or texture on opposite sides.

The present invention provides a unique softer feel surface on at least one side of a structure or panel, such as a blind louver or slat. Additionally, as described above, the present invention contemplates an almost endless combination of surfaces, textures, patterns, colors and materials, which provide the user or manufacturer with an endless variety of options. Some of the multitude of options are listed hereinafter, however, the options contemplated by the present invention are not so limited. The structure can be a single soft non-rigid layer, embossed on one or both sides, with the same or different patterns or not be embossed at all. The layer can include various compounds including color and/or pearlescent pigments; can be printed on one or both sides, again either the same or different patterns and also can be a clear polymer material with only the colors provided by surface printing. The printed and colored materials also can be embossed. These combinations also can be included in a composite structure having an opaque or non-opaque substrate and a soft non-rigid layer or cap extruded on one or both sides. One of the caps also can be rigid when capping both sides of a rigid substrate for a different look or for stability of the structure or for a combination of reasons.

Many modifications and variations of the present invention are possible in light of the above teachings. It is therefore to be understood that within the scope of the appended claims, the invention may be practiced otherwise than as specifically described.

What is claimed is:

1. An improved multilayer composite structure, comprising:
    a first substantially rigid thermoplastic polymer substrate; and
    a second substantially non-rigid thermoplastic polymer layer formed on a first side of said substrate, said layer formed of a thermoplastic polymer material having a durometer in the range of about 60 to 95 as measured on the Shore A scale, said layer having an opposite side providing a more fabric-like surface, both visually and tactilely.

2. The composite structure as defined in claim 1, wherein said second layer surface has a pattern formed thereon.

3. The composite structure as defined in claim 2, wherein said pattern is embossed thereon.

4. The composite structure as defined in claim 2, wherein said pattern is printed thereon.

5. The composite structure as defined in claim 4, wherein said printed pattern is embossed.

6. The composite structure as defined in claim 1, wherein said substrate is opaque.

7. The composite structure as defined in claim 1, wherein said substrate is not opaque.

8. The composite structure as defined in claim 1, wherein said second layer includes at least one color pigment.

9. The composite structure as defined in claim 1, wherein said second layer includes a pearlescent pigment.

10. The composite structure as defined in claim 1, wherein said composite structure is formed as a blind louver.

11. The composite structure as defined in claim 1, wherein said composite structure is formed as a blind louver slat.

12. The composite structure as defined in claim 11, wherein said composite structure includes rounded strengthening edges.

13. The composite structure as defined in claim 1, further comprising a third substantially non-rigid thermoplastic polymer layer formed on a second opposite side of said substrate and having an improved opposite side providing an improved more fabric-like surface, both visually and tactilely.

14. The composite structure as defined in claim 13, wherein at least one of said surfaces has a pattern formed thereon.

15. The composite structure as defined in claim 14, wherein at least one of said patterns is embossed thereon.

16. The composite structure as defined in claim 14, wherein at least one of said patterns is printed thereon.

17. The composite structure as defined in claim 16, wherein at least one of said printed patterns is embossed.

18. The composite structure as defined in claim 13, wherein said composite structure is formed as a blind louver.

19. The composite structure as defined in claim 13, wherein said composite structure is formed as a blind louver slat.

20. The composite structure as defined in claim 19, wherein said composite structure includes rounded strengthening edges.

21. A method of forming an improved multilayer composite structure, comprising:
    forming a first substantially rigid thermoplastic polymer substrate; and
    forming a second substantially non-rigid thermoplastic polymer layer on a first side of said substrate from a thermoplastic polymer material having a durometer in the range of about 60 to 95 as measured on the Shore A scale having an opposite side providing a more fabric-like surface, both visually and tactilely.

22. The method as defined in claim 21, including forming a pattern on said second layer surface.

23. The method as defined in claim 22, including embossing said pattern thereon.

24. The method as defined in claim 22, including printing said pattern thereon.

25. The method as defined in claim 24, including embossing said printed pattern.

26. The method as defined in claim 21, including forming said substrate from an opaque material.

27. The method as defined in claim 21, including forming said substrate from a material which is not opaque.

28. The method as defined in claim 21, including forming said second layer including at least one color pigment.

29. The method as defined in claim 21, including forming said second layer including a pearlescent pigment.

30. The method as defined in claim 21, including forming said composite structure as a blind louver.

31. The method as defined in claim 21, including forming said composite structure as a blind louver slat.

32. The method as defined in claim 31, including forming rounded strengthening edges on said composite structure.

33. The method as defined in claim 21, including forming said composite structure by coextruding said substrate and said second layer.

34. The method as defined in claim 21, including forming a third substantially non-rigid thermoplastic polymer layer on a second opposite side of said substrate having an improved opposite side providing an improved more fabric-like surface, both visually and tactilely.

35. The method as defined in claim 34, including forming a pattern on at least one of said surfaces.

36. The method as defined in claim 35, including embossing at least one of said patterns.

37. The method as defined in claim 31, including printing at least one of said patterns.

38. The method as defined in claim 37, including embossing at least one of said printed patterns.

39. The method as defined in claim 34, including forming said composite structure as a blind louver.

40. The method as defined in claim 34, including forming said composite structure as a blind louver slat.

41. The method as defined in claim 40, including forming rounded strengthening edges on said composite structure.

42. The method as defined in claim 34, including forming said composite structure by coextruding said substrate and said first and second layers.

43. The composite structure as defined in claim 1, wherein said layer of thermoplastic polymer material has a durometer in the range of about 65 to 70 as measured on the Shore A scale.

44. The method as defined in claim 21, including forming said second layer thermoplastic polymer material to have a durometer in the range of about 65 to 70 as measured on the Shore A scale.

* * * * *